United States Patent
Pieper

[15] 3,636,393
[45] Jan. 18, 1972

[54] COUPLING COMPONENTS FOR ELECTRIC MACHINE

[72] Inventor: Wolfgang Pieper, Wurzburg, Germany
[73] Assignee: Siemens Aktiengesellschaft
[22] Filed: Feb. 26, 1970
[21] Appl. No.: 14,435

[30] Foreign Application Priority Data
Mar. 4, 1969 Germany........................P 19 10 868.0

[52] U.S. Cl..................................310/71, 310/238, 310/249
[51] Int. Cl.........................................................H02k 13/00
[58] Field of Search....................310/71, 233, 234, 8, 9, 241, 310/68.1, 68.4, 72, 249

[56] References Cited

UNITED STATES PATENTS 1,240,585  9/1917  Lee.........................................310/241
3,182,218  5/1965  Videtic....................................310/239

Primary Examiner—D. X. Sliney
Attorney—Curt M. Avery, Arthur E. Wilfond, Herbert L. Lerner and Daniel J. Tick

[57] ABSTRACT

An electric machine has a rotor, bearing plates for the rotor, a stack of stator laminations affixed to the bearing plates and a winding mounted on the stator laminations. Each of a plurality of insulating members is mounted on a corresponding one of a plurality of attachments and recesses for holding the insulating members. Each of a plurality of socket connections is mounted on a corresponding one of the insulating members. Electrically conductive means are electrically connected at one end to each of the socket connections and are adapted to be connected at the other end of each to a component of the machine.

9 Claims, 7 Drawing Figures ated
3,636,393

COUPLING COMPONENTS FOR ELECTRIC MACHINE

DESCRIPTION OF THE INVENTION

The invention relates to an electric machine. More particularly, the invention relates to coupling components for an electric machine. The electric machine may comprise, for example, a universal motor utilized in household appliances, office machines, or the like, and including a stack of stator laminations connected to bearing plates or end shields of the rotor.

The mounting of an electric machine of the aforedescribed type has been so effected prior to my invention, that the electrical wiring of the winding was provided after the wrapping of the stator and the mounting of the bearing plates. In order to accomplish this, it was necessary to insulate the end turns, to solder the end turns to flexible electrically conductive members or components, and to subsequently reinsulate the components. The wiring of the winding was usually undertaken prior to the casing of the winding, in order to provide the soldered ends with the necessary stability, during the operation of the motor.

An object of the invention is to decrease the costs of mounting, as well as manufacturing, of machines of the aforedescribed type, without impairing their operational reliability. The wiring within the machine of my invention is considerably simplified. In a machine of this type, the invention lies in the provision of the stacks of stator laminations with attachments and/or recesses for mounting the insulating members. The insulating members support the socket connections, which socket connections are in electrical contact with electrically conductive means which are connected to windings or other components of the machine. This permits the wiring of the stack of stator laminations completely prior to the final mounting of the electric machine, without solder or insulating processes. Since the attachments and/or recesses of the stack of stator laminations themselves necessitate a special end plate, it is preferable, in order to simplify the structure of the machine, to provide such attachments and/or recesses on a bearing frame which is positioned between said stack of stator laminations and the rotor and is connected to the stator laminations.

It is basically known to provide a bearing frame between the stack of stator laminations and the rotor. The bearing frame has profiled legs, arms, or extending portions, for clamping an intermediate insulating member therebetween. This is described in German Pat. No. DAS 1,278,598.

The principal object of the invention is to provide a new and improved electric machine having a new and improved arrangement of coupling components which may be manufactured at reduced costs without impairment of its operational reliability and which is of simple structure, inexpensive in manufacture and reliable, efficient and effective in operation.

Another object of the invention is to provide an electric machine which may be wired completely prior to the final mounting of the motor, without soldering or insulating.

In accordance with my invention, the bearing frame having the attachments is coupled to the stack of stator laminations in a particularly simple manner by means of flat legs, arms or extending portions, which are inserted in dovetailed recesses formed through the stack of stator laminations and produced of arches. As a result, each leg is inserted into the corresponding recess of the stack of stator laminations in a manner whereby deformation of said stack of stator laminations is prevented. Another preferred arrangement for coupling the bearing frame and the stack of stator laminations comprises the provision of sawtooth-shaped edges on the legs of the bearing frame. The legs having the sawtooth-shaped edges are inserted into the dovetailed recesses formed in the stack of stator laminations, accompanied by a slight variation in shape.

The bearing frame which supports the attachments may comprise a punched bent member. In such case, it is preferable that the recesses be formed in flat bent parts of the bearing frame and that such flat bent parts have slots formed therein extending from the edges thereof to such recesses. The slots accommodate the electrically conductive members which are connected to the socket connections. The recesses are feasible without additional outputs and may have a smaller opening width than the insulating members in order to accommodate said insulating members by a simple snap-in of said insulating members. Each socket connection may be provided with sawtooth-shaped edges on a portion thereof which may be inserted into a recess formed in a corresponding one of the insulating members. The end turns may be connected to the socket connections by welding. The carbon brushes of the electric machine are coupled to the socket connections by counter socket connections connected to said socket connections via flexible electrical conductors, in order to permit the connection of the terminals of the electric machine without soldering.

In accordance with the invention, an electric machine having a rotor, bearing plates for the rotor, a stack of stator laminations affixed to the bearing plates and a winding mounted on the stator laminations comprises a plurality of insulating members. A plurality of attachments and recesses hold insulating members. Each of the insulating members is mounted on a corresponding one of the attachments. Each of a plurality of socket connections is mounted on a corresponding one of the insulating members. Electrically conductive means are electrically connected at one end to each of the socket connections and are adapted to be connected at the other end of each to a component of the machine.

A bearing frame is positioned between the stack of stator laminations and the rotor, and the attachments and recesses are provided on the bearing frame.

The electrically conductive means are welded to the socket connections.

Each of the insulating members has a recess formed therein. Each of the socket connections has a portion having sawtooth-shaped edges inserted into the recess of a corresponding one of the insulating members.

Each of a pair of counter socket connections is electrically connected to a corresponding one of a pair of brushes. Each of the counter socket connections is adapted to be coupled with a corresponding one of the socket connections.

Each of the recesses has an opening thereto having a width smaller than that of each of the insulating members.

The stack of stator laminations has dovetailed recesses formed therein and the bearing frame has a pair of flat legs which are inserted into the recesses of the stack of stator laminations and couple the bearing frame to the stack of stator laminations. The legs of the bearing frame have sawtooth-shaped edges.

The bearing frame comprises a punched bent component and has flat parts. The recesses are formed through the flat parts with slots extending from each of the recesses to the edge of the corresponding flat part of the bearing frame. The slots accommodate the electrically conductive members.

In order that the invention may be readily carried into effect, it will now be described with reference to the accompanying drawings, wherein.

In the FIGS., the same components are identified by the same reference numerals.

Figure 1:
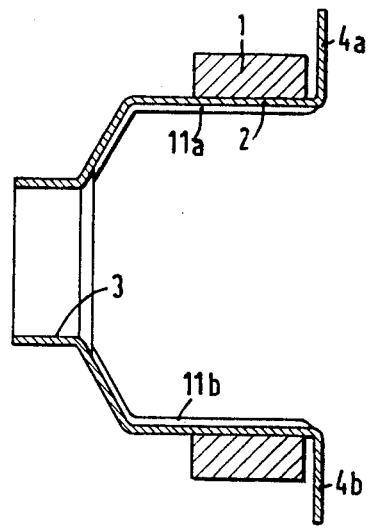
FIG. 1 is a sectional view of an embodiment of a bearing frame of the electric machine of the invention.

In FIG. 1, a stack of stator laminations 1 is affixed to a bearing frame 2 in an electric machine. The bearing frame 2 has an opening or bore 3 which accommodates a bearing for the rotor of the machine (not shown in FIG. 1). The bearing frame 2 has bent flat parts 4a and 4b which function to couple a bearing plate 5 (FIG. 5) and a plurality of attachments 6, 7, 8 and 9, and recesses 10 (FIG. 2) to the electric machine. The recesses 10 accommodate insulating members, hereinafter described in detail.

Figure 3:
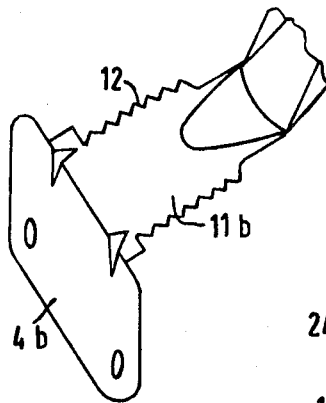
FIG. 3 is a perspective schematic diagram of a leg of the bearing frame of FIGS. 1 and 2.

The bearing frame 2 has a pair of spaced flat legs, arms or extending members 11a and 11b which are utilized to couple said bearing frame to the stack of stator laminations 1. Each of the legs may have sawtooth-shaped edges 12 formed thereon, as illustrated in FIG. 3 for the leg 11b. Each of the legs 11a and 11b of the bearing frame 2 is inserted into a corresponding one of dovetailed recesses formed in the stack of stator laminations 1.

Another arrangement for coupling the bearings frame 2 to the stack of stator laminations 1 involves the arching of the legs 11a and 11b and the insertion of said legs into corresponding dovetailed recesses formed through said stack of stator laminations. The legs 11a and 11b are subsequently flattened by radial pressure, so that their edges are tightly clamped in the corresponding dovetailed recesses.

Figure 6:
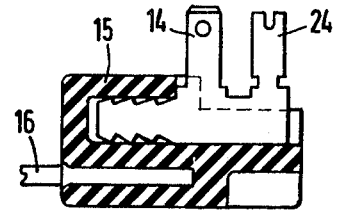
FIG. 6 is a view, partly in section, of an insulating member and a socket connection of the electric machine of the invention, on an enlarged scale.

The combination unit of the stack of stator laminations 1 and the bearing frame 2 is then preferably provided with a winding 13 (FIG. 4) having ends which are electrically connected to corresponding socket connections. The ends of the winding may be welded to the corresponding socket connections. As shown in FIG. 6, each socket connection 14 has a leg 24 about which the electrically conductive winding or wire may be wound and to which the ends 17a and 17b of such wire may be welded.

Figure 4:
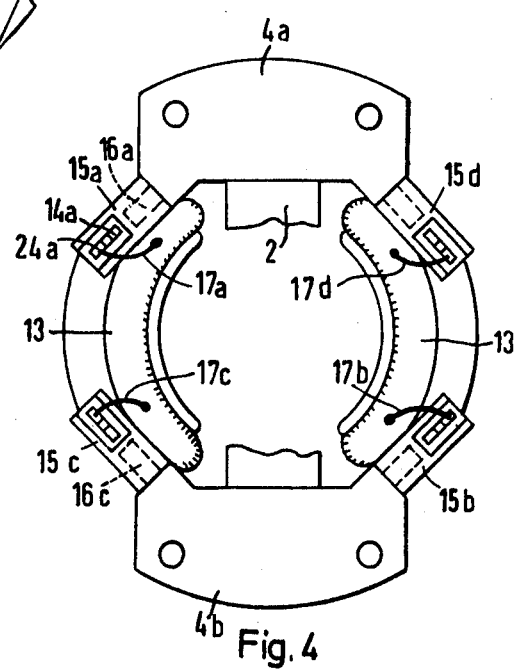
FIG. 4 is a schematic diagram of the stack of the stator laminations and bearing frame of the electric machine of the invention.

The ends 17a and 17b of the winding 13 are shown in FIG. 4. Each socket connection 14 is mounted in a recess formed in a corresponding one of a plurality of insulating members 15, as shown in FIG. 6. The socket connection 14 has an extending portion having sawtooth-shaped edges formed therein and inserted into the corresponding recess of the corresponding insulating member 15. Each insulating member 15 is mounted on a corresponding one of a plurality of attachments 16, as shown in FIG. 6, by a bayonet-type coupling. The attachments 16 are affixed to the bearing frame 2.

The structure of the electric machine or motor of the invention is particularly well suited for assembly line manufacture on a round table installation. First, the socket connections 14 are inserted into the corresponding insulating members 15. The insulating members 15 are then affixed to the bearing frame via the attachments 16. The bearing frame 2 is then coupled or affixed to the stack of stator laminations 1 by inserting its legs 11 into the corresponding dovetailed recesses of said stack of stator laminations or by inserting said legs in similar undercuts or accommodating recesses of said stack of stator laminations. The wire ends 17a, 17b, 17c and 17d are then electrically connected to the corresponding socket connections 15a, 15b, 15c and 15d (FIG. 4) by mechanical means. The bearing plate 5 is then mounted on the assembly (FIG. 5).

Figure 2:
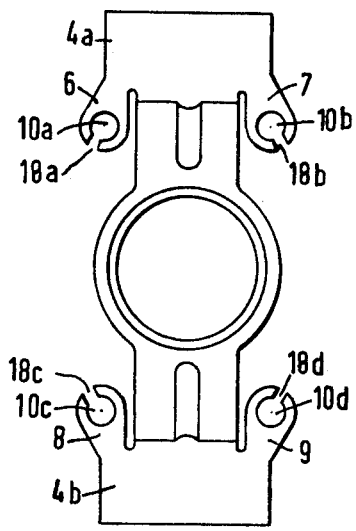
FIG. 2 is a top view of the bearing frame of FIG. 1.

Round insulating members may be utilized to replace the insulating members 15. The round insulating members may be inserted into the recesses 10a, 10b, 10c and 10d of the attachments 6, 7, 8 ad 9 (FIG. 2). In order to accommodate the ends 17a, 17b, 17c and 17d of the winding in the corresponding recesses 10a, 10b, 10c and 10d, said ends are passed through slots 18a, 18b, 18c and 18d formed in the attachments 6, 7, 8 and 9, respectively, each extending from its corresponding recess to the edge of its corresponding attachment (FIG. 2). The dimensions of the recesses 10a, 10b, 10c and 10d are determined to enable the mounting of the insulating members 15a, 15b, 15c and 15d in the corresponding ones of said recesses and to maintain said insulating members firmly.

Figure 5:
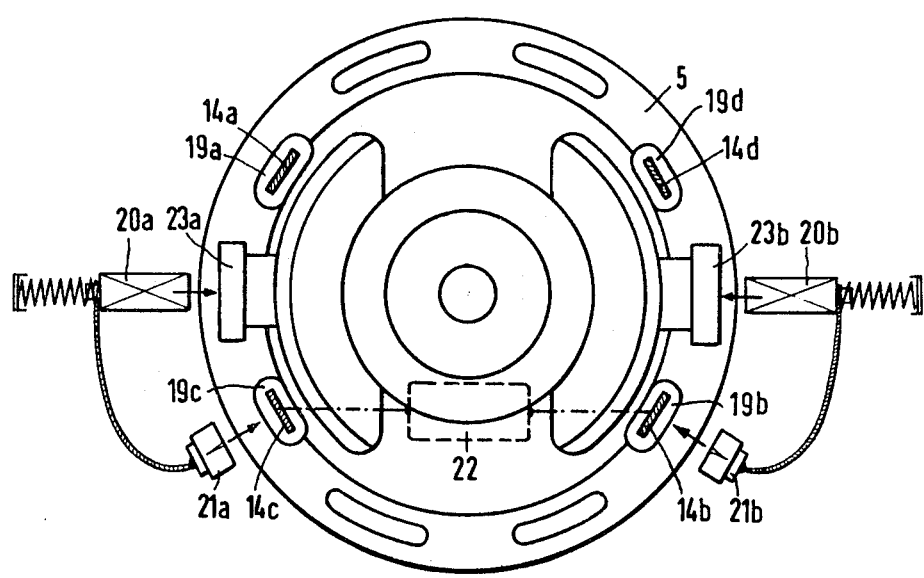
FIG. 5 is a schematic diagram of the entire assembled electric machine of the invention.
Figure 7:
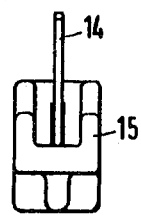
FIG. 7 is a top view of the insulting member and socket connection of FIG. 6.

FIG. 5 is a view of the completely assembled electric machine of the invention. The socket connections 14a, 14b, 14c and 14d are accessible via corresponding recesses 19a, 19b, 19c and 19d, formed through the bearing plate 5, from the outside. A pair of carbon brushes 20a and 20b are provided. The carbon brush 20a is electrically connected to the socket connection 14c via a counter socket connection 21a which is coupled to said socket connection by a bayonet-type coupling. The carbon brush 20b is electrically connected to the socket connection 14b via a counter socket connection 21b which is coupled to said socket connection via a bayonet-type coupling. The remaining socket connections 14a and 14d are electrically connected to a power supply source for the electric machine, after said machine is mounted.

In order to further simplify the mounting of the electric machine of the invention, it is preferable to hold the counter socket connections 21a and 21b (FIG. 5) in the bearing plate 5 during he mounting of said bearing plate whence they will come into electrical contact with the corresponding socket connections 14c and 14b.

In the embodiment of the electric machine of the invention, as shown in FIG. 5, a capacitor 22 may be connected to eliminate interference. The capacitor 22 may be electrically connected either to the socket connections of a pair of carbon brush guides 23a and 23b, or may be connected, via double socket connections, to the socket connections 14c and 14b to which the carbon brushes 20a and 20b, respectively, are connected.

It is evident from the foregoing description and from the FIGS., that the mounting provided for an electric machine of the invention may be effected with very little expenditure, whereby additional flexible electrically conductive wires may be eliminated.

While the invention has been described by means of specific examples and in specific embodiments, I do not wish to be limited thereto, for obvious modifications will occur to those skilled in the art without departing from the spirit and scope of the invention.

I claim:

1. A universal motor for household appliances, office machines, and the like, having a rotor, bearing plates for the rotor, a stack of stator laminations connected to the bearing plates, a winding supported on the stator laminations, a plurality of insulating members and plug and socket connections electrically connected to the ends of the winding and supported by the insulating members, said motor comprising a bearing frame (2) affixed to the stack of stator laminations and having attachments (6, 7, 8, 9 and 16) and recesses (10) accommodating the insulting members.

2. A motor as claimed in claim 1, wherein the ends of the winding are welded to said socket connections.

3. A motor as claimed in claim 1, wherein each of said insulating members has a recess formed therein and each of the attachments is a plug having sawtooth-shaped edges insertable into the recess of a corresponding one of said insulating members.

4. A motor as claimed in claim 1, further comprising a pair of brushes and a pair of counter socket connections each electrically connected to a corresponding one of said brushes and each adapted to be coupled with a corresponding one of said socket connections.

5. A motor as claimed in claim 1, wherein each of said recesses has an opening thereto having a width smaller than that of each of said insulating members.

6. A motor as claimed in claim 1, wherein said stack of stator laminations had dovetailed recesses formed therein and said bearing frame has flat legs formed therein from bulges which are inserted into the recesses of said stack of stator laminations and affix said bearing frame to said stack of stator laminations.

7. A motor as claimed in claim 1, wherein said stack of stator laminations has dovetailed recessed formed therein and said bearing frame has flat legs having sawtooth-shaped edges which are inserted with slight changes of shape into the recesses of said stack of stator laminations and affix said bearing frame to said stack of stator laminations.

8. A motor as claimed in claim 1, wherein said bearing frame comprises a punched bent component.

9. A motor as claimed in claim 1, further comprising electrically conductive means electrically connected to the plug and socket connections and wherein and said bearing frame has bent flat parts and said recesses are formed through said flat parts with slots extending from each of said recesses to the edge of the corresponding flat part of said bearing frame, said slots being adjacently positioned for accommodating said electrically conductive means.

\* \* \* \* \*